Oct. 12, 1943.  J. E. HENNINGSEN  2,331,684
PLANETARY TRANSMISSION DEVICE
Filed March 28, 1942  3 Sheets-Sheet 2

Inventor
JOHN E. HENNINGSEN
By Carlsen + Hoyle
Attorney

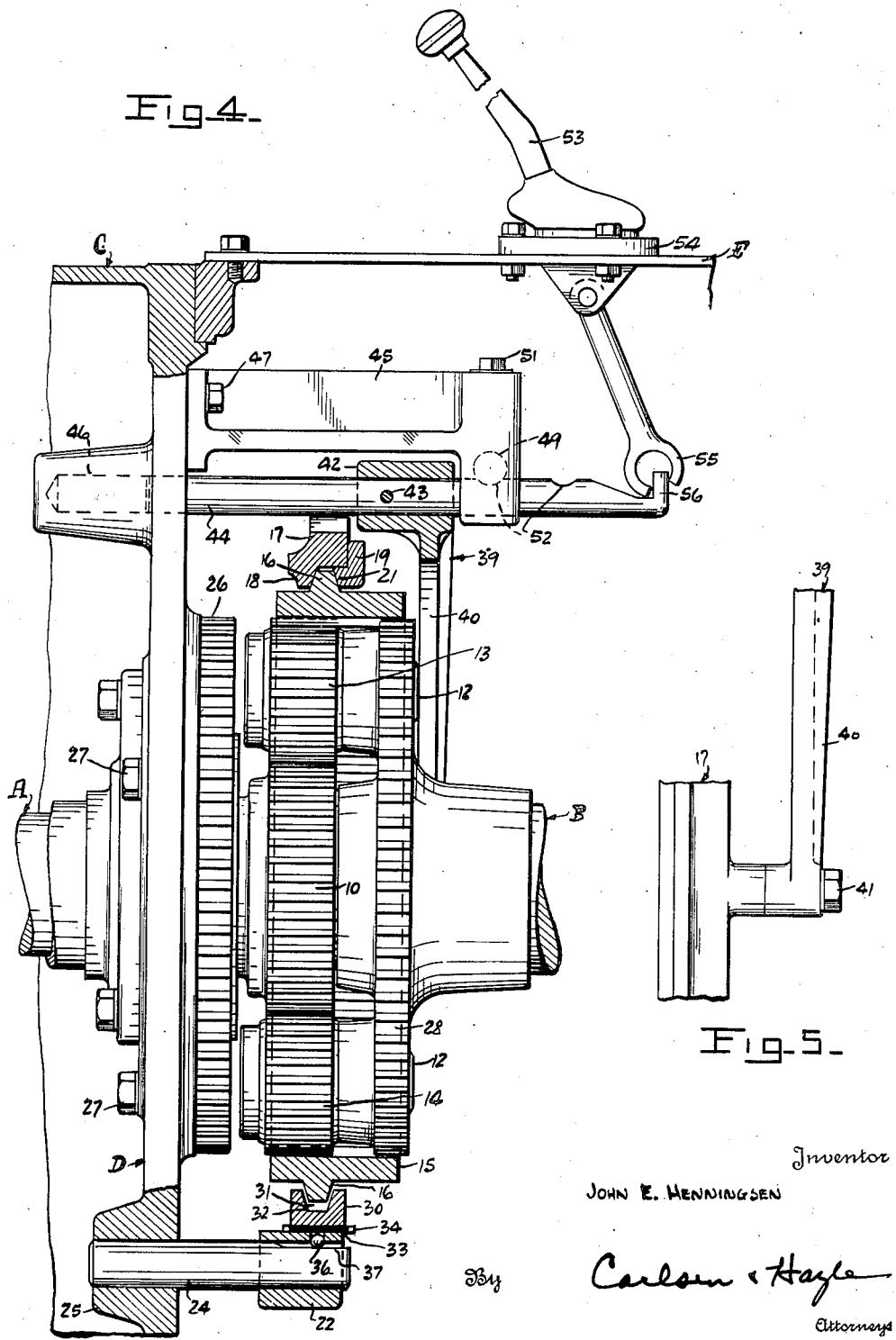

Patented Oct. 12, 1943

2,331,684

UNITED STATES PATENT OFFICE 2,331,684

PLANETARY TRANSMISSION DEVICE

John E. Henningsen, Minneapolis, Minn., assignor to Minneapolis-Moline Power Implement Company, Minneapolis, Minn., a corporation of Delaware Application March 28, 1942, Serial No. 436,558

10 Claims. (Cl. 74—291)

This invention relates to improvements in planetary transmission devices for connecting driving and driven parts of an automotive vehicle or power transmitting mechanism of other kinds.

The usual type of planetary or epicyclic transmission, embodies a driving gear, an outer or ring gear concentric therewith and planetary pinions meshing with both the driving and ring gears. The speed differential between the driving gear and the driven part carrying the planetary pinions is then controlled by either locking the ring gear against rotation or permitting it to turn with the other gears, this action being accomplished by a brake band encircling said ring gear.

It is the primary object of this invention to improve on the construction of planetary transmissions of this nature by providing mechanical means for shifting the outer or ring gear and either positively locking it against rotation or entirely freeing it for rotation with the driven part of the gear train. Another object is to provide in such a transmission means for automatically braking or releasing the outer or ring gear as it is shifted in order to bring it to a halt in its rotating movement as it approaches its locked position and, conversely, to free the gear as it approaches its rotating position and engagement with the driven part of the transmission.

These and other more detailed and specific objects will be disclosed in the course of the following specification, reference being had to the accompanying drawings, in which—

Fig. 4 is a side elevation, partially in longitudinal section, showing the ring gear shifted to the position in which it rotates with the driven parts of the transmission.

Fig. 5 is a fragmentary side elevation of the shifting fork and a part of the carrier member for the ring gear showing the connection therebetween.

Figure 1:
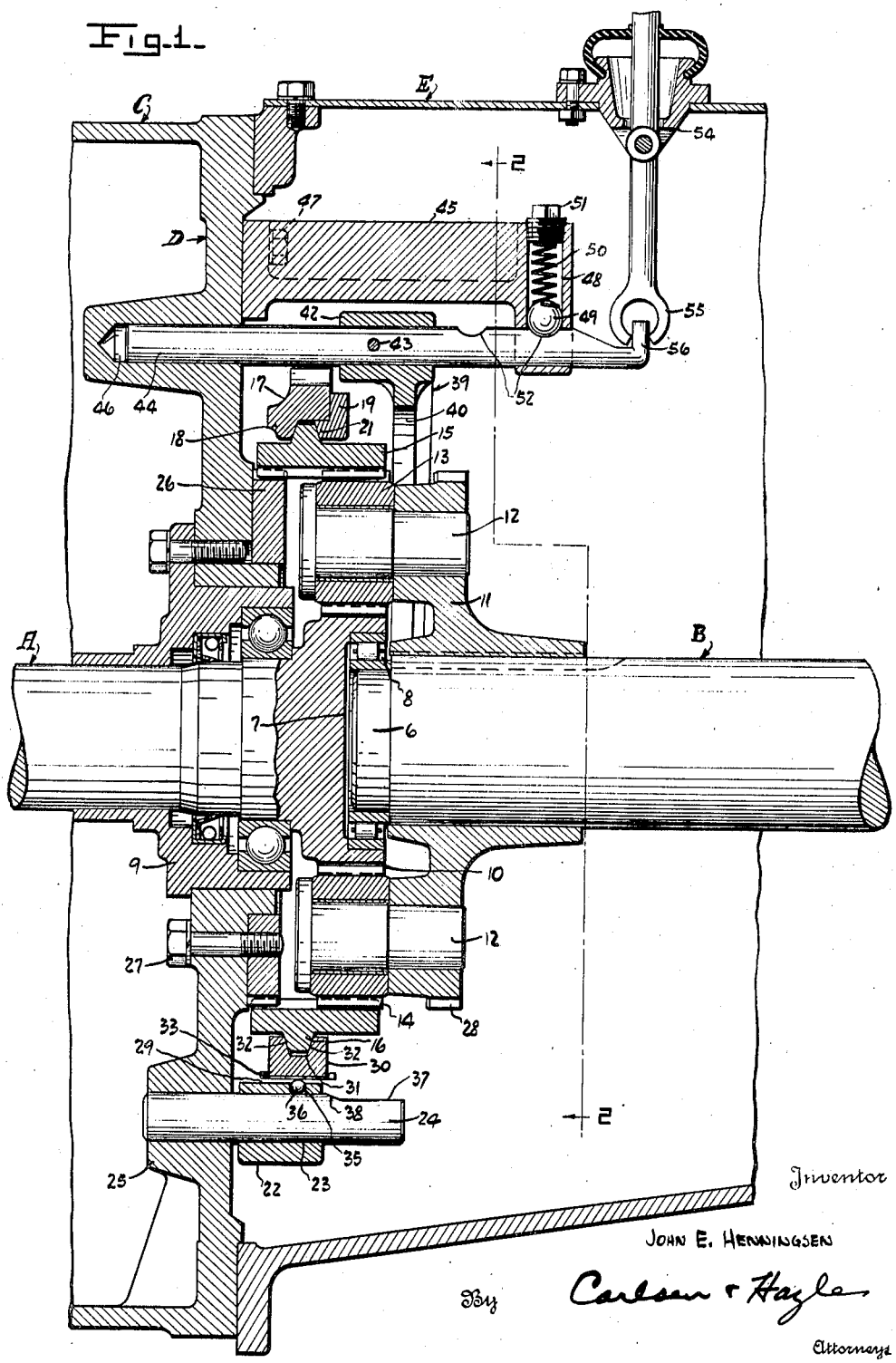
Fig. 1 is a longitudinal sectional view through a transmission constructed in accordance with any invention and showing the outer or ring gear in its stationary, locked position.
Figure 2:
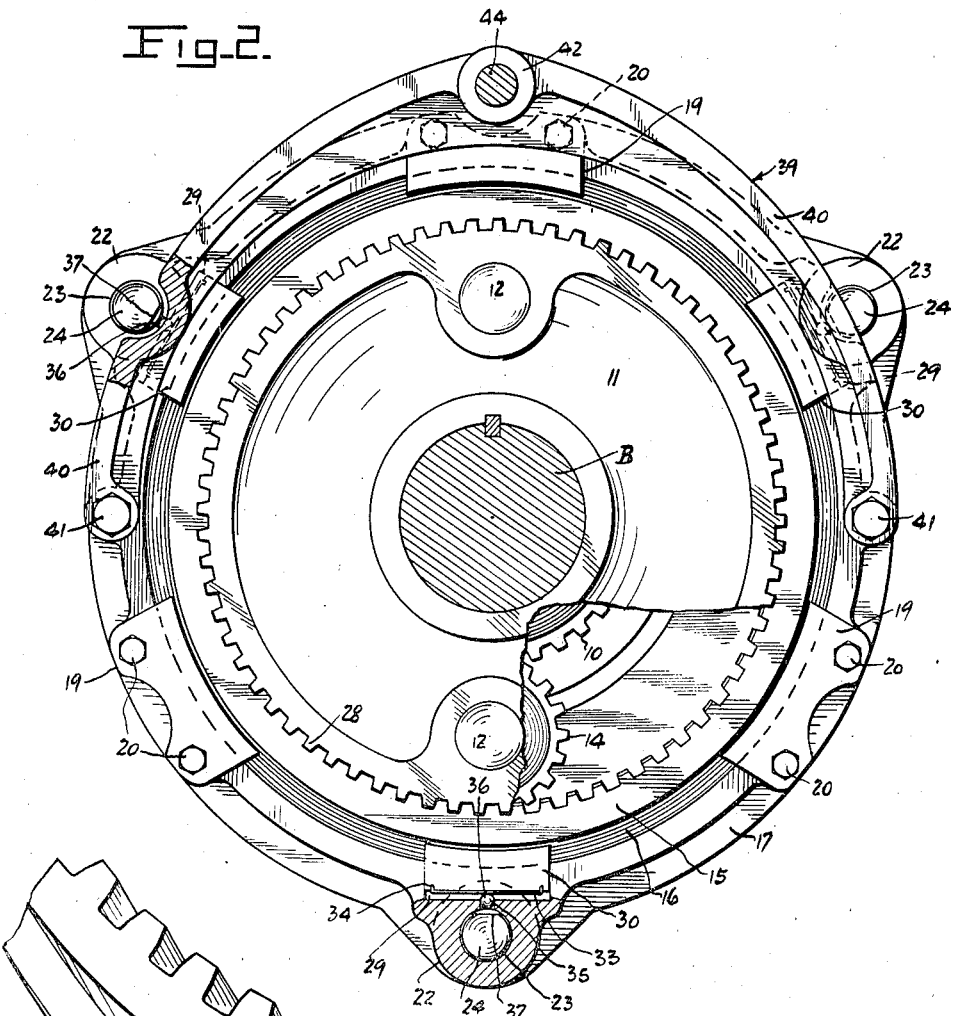
Fig. 2 is a cross sectional view substantially along the line 2—2 in Fig. 1 and showing certain parts as broken away to better disclose the construction.
Figure 3:
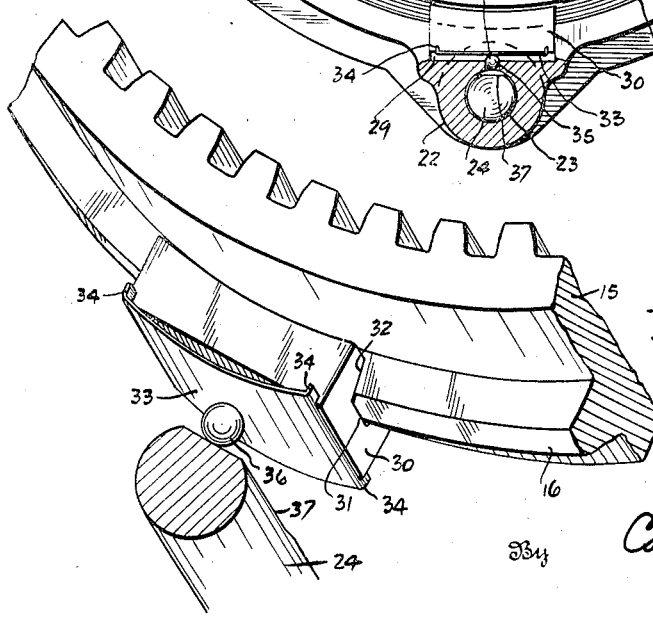
Fig. 3 is an enlarged, fragmentary perspective view showing the engagement between ring gear and the brake means therefor.

Referring now more particularly and by reference characters to the drawings, A and B represent generally the driving and driven shafts, respectively, which are arranged in end to end, coaxial relation and which are to be connected together by the planetary transmission device of my invention. All parts are arranged in a housing or casing C of any suitable construction and shape but which includes an end wall D and cover plate or top wall E to which certain parts of my invention are connected and mounted.

The driven shaft B has a diametrically reduced end 6 which is received in a recess 7 in the end of the driving shaft A and journaled therein by a bearing 8, and a bearing structure 9 secured to and through the housing end wall D supports both shafts. The shafts may of course thus rotate independently and the necessary additional support for the shafts may be provided by suitable bearings (not shown) adjacent the points at which they are connected, respectively, to the driving element or engine and to the driven element. In the particular assembly to which I contemplate the application of my invention the driving shaft is connected through the usual clutch to the vehicle engine while the driven shaft is connected to the usual change speed transmission so that the two range speed variation obtained in the planetary device will double the number or possible speeds obtainable at the output of the change speed mechanism itself.

The driving shaft A carries a driving gear 10 at its end while the adjacent end of the driven shaft B is a driven part in the form of a spider or circular plate 11 having rigidly mounted pins 12 spaced outwardly from the center of the shaft to rotatably support the planetary pinions or gears 13 and 14. Said pinions 13 and 14 mesh with the driving gear 10 as clearly shown and may be two or more in number. An internally toothed outer gear or ring gear 15 is then arranged concentrically about the other gear with its teeth in mesh with the planetary pinions 13 and 14. The structure thus far follows the usual pattern of epicyclic gear trains and it is evident that, by causing the ring gear to run or rotate with the planetary gears and driven parts of the mechanism, the speed ratio between driving and driven shafts will be one to one or direct whereas, by locking the ring gear against rotation, the speed ratio will be reduced causing the driven shaft to rotate at a slower rate than the driving shaft at a variation dependent upon the relative pitch diameters of the various gears.

In accordance with my invention such control of the ring gear 15 is obtained in a simple and positive manner as will now be described. The gear has an annular, outwardly projecting and tapering tongue or rib 16 formed around its outer peripheral surface and the gear is loosely received and mounted within an annular carrier frame or member 17. The internal diameter of the frame 17 receives and engages the outer, narrower edge of the tongue 16 but at one side the frame has an inwardly extending internal flange or shoulder 18 which will engage one side of said tongue when the gear and frame are assembled. Several retaining plates 19 are then secured in spaced positions around the frame, by means of bolts or cap screws 20, and have angularly faced off ends 21 adapted to engage the opposite side of the tongue (Figs. 1 and 4) and thus hold the frame and gear together while permitting free rotation of the gear with respect to the carrier frame.

At spaced points around its diameter the annular carrier frame 17 then has outwardly projecting lugs or ears 22 provided with apertures 23 to slidably receive mounting pins 24 which are rigidly anchored in sockets 25 in the housing end wall D and extend outwardly therefrom at equally spaced points around the planetary gear assembly and, of course, in directions parallel with the axes of the shafts A and B. This arrangement obviously will permit the ring gear 15 and its carrier frame 17 to be shifted back and forth around the shafts and in planes parallel thereto.

Secured to the housing end wall D concentrically with respect to the shaft A is a stationary locking gear 26 in the form of an externally toothed ring of a diameter such as to nicely fit and mesh with the ring gear 15. This gear is secured rigidly in place by screws as represented at 27. A movable or rotatable locking gear 28 of the same diameter is then formed or secured on the driven member 11 preferably by toothing the peripheral margin of the circular disk or plate carrying the planetary pinion pins 12.

The permissible range of shifting movement of the ring gear 15 is such that it may be moved from a position in which one edge portion is in mesh with the stationary gear 26 (Fig. 1) to a position in which the opposite edge portion is in mesh with the moving gear 28 (Fig. 4), the ring maintaining its meshed relation with the planetary pinions 13 and 14 throughout. The locking gears 26 and 28 are thus arranged at opposite sides of the plane of the driving gear 10 and planetary pinions as clearly shown and the width of the ring gear is such that it will remain in mesh with the planetary pinions as it is shifted back and forth in the manner described.

Obviously when the ring gear 15 is in mesh with the stationary locking gear 26 it will be locked against rotation causing the planetary gears to travel around its interior and the speed of rotation of the driven shaft will be reduced with respect to that of the driving shaft. On the contrary, when the ring gear is moved over into mesh with the rotatable locking gear 28 it becomes a rotating unitary part of the driven element 11 coupling the driving and driven shafts directly together.

As the ring gear is shifted between these two positions it is alternately locked against rotating movements and freed for such movement to thus facilitate proper meshing with the gears 26 and 28 by means of braking means as will now be described. At spaced points around its internal periphery the carrier frame 17 is provided with recesses 29 which fall in alignment with radii passing through the apertures 23 receiving the pins 24 and in each of such recesses a brake block or shoe 30 is mounted and arranged for movement toward and away from the outer periphery of the carrier frame in a radial direction. In its inner surface, which is arcuate to follow the contour of frame 17, the brake shoe has a groove 31 adapted to receive and engage the tongue or rib 16 on the frame and this groove has angular, inwardly divergent sides 32 to engage the correspondingly angled side surfaces of said tongue. A normally arcuate or bowed leaf spring 33 is arranged in each recess 29 and braced against the outer side or back of the brake shoe 30 therein. The inward pressure of this spring may urge the brake shoe inwardly toward the frame A and thus cause a wedging engagement between the groove 31 and tongue 16. Inasmuch as the brake shoes as located in the recesses 29 are locked against movement endwise, or around the carrier frame, this wedging action will exert a frictional braking force sufficient to effectively prevent rotation of the gear 16 within the frame. Ears 34 are bent from the corners of the springs 33 to hold them in proper engagement with the brake shoes as will be clearly evident.

Extending between each of the recesses 29 and the adjacent aperture 23 is a bore or passage 35 and located therein is a ball 36 adapted to bear between the back or outer surface of the spring 33 near its center and the adjacent peripheral surface of the pin 24 in said aperture. The diameter of the ball is such, and other parts are so dimensioned, that when thus engaged (Fig. 1) the ball will exert an inward pressure upon the spring 33 giving it a tendency to flatten out and causing a yieldable pressure to be exerted upon the brake shoe 30 to urge it into frictional braking engagement with the ring gear. Outer end or side portions of the pins 24 are flattened off, however, as indicated at 37 so that as the ring gear 15 and frame 17 are shifted toward the rotating gear 28 the balls 36 will travel on these flattened sides of the pins permitting the balls to move outwardly in radial lines and relieve the springs 33 of pressure as seen in Fig. 4. As this occurs the brake shoes 30 may obviously move outwardly in their recesses 29 to clear or substantially clear the tongue 16 and permit the ring gear to rotate freely. Then as the ring gear is shifted back toward meshing engagement with the stationary gear 26 the balls act as cams and move inwardly over the inclined surfaces 38 back upon the rounded peripheral sides of the pins camming or urging the balls inwardly again into pressure engagement with the springs 33 and pressing the brake shoes into frictional braking engagement with the ring gear.

The junctions between the flattened side surfaces 37 of the pins and the remainder thereof, as constituted by the inclined surfaces 38, are so located that as the ring gear approaches the gear 26 it will be braked to a stop to facilitate its meshing with that gear and as the ring gear moves in the opposite direction toward the rotating gear 28 it will be released and allowed to start rotating with the driven parts before it reaches meshing engagement with said gear 28. This alternate braking and releasing action is carried out in proper sequence and timing entirely automatically as a result of shifting the ring gear.

For shifting the parts as required I provide a shifting fork 39 having depending arcuate legs 40 which at their ends are secured by cap screws 41 to the carrier frame 17 at diametrically opposite points thereon. At the junction of said legs they have an apertured hub 42 which is secured by a pin 43 upon a shifting rod 44, said rod being slidably mounted in a bracket 45 and in a socket 46 formed in the housing end wall D so that the rod may slide endwise in a direction parallel to the shifting movement of the ring gear 15. The bracket 45 is secured by screws 47 to said end wall D and at one end has a bore 48 traversed at its lower end by the shifting rod 44 where same slides through the bracket. In said bore 48 a latching ball 49 is arranged and is urged against the rod 44 by a spring 50 retained in place by a plug 51. The shifting rod has spaced notches 52 adapted to be successively engaged by the ball 49 one notch being properly located to receive the ball when the ring gear 15 is in stationary locked position and the other notch being located to receive the ball when the ring gear is in its rotating position. See Figs. 1 and 4. The ball of course acts in a well known manner as a latch to releasably retain the shifting rod and all connected parts in either of the two required adjusted positions.

A gear shift lever 53 is pivoted by a conventional form of fitting 54 in and through the top plate E of the housing and its lower end is forked as at 55 to engage a finger 56 turned upwardly from the end of the shifting rod 44. Obviously the shifting rod and the fork 39 may then be moved back and forth by manipulating the lever 53 and such movement will shift the carrier frame 17 along the pins 24 in the manner described. As this action takes place then the ring gear 15 is shifted from stationary to rotating positions and properly braked and released to facilitate its meshing with the respective locking gears 26 and 28.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination with a planetary transmission device including a ring gear, of means for operatively shifting said ring gear between a stationary position and a position in which it rotates with a part of the transmission, and brake means connected to and movable with said ring gear and automatically operative by said shifting movements of the ring gear to engage and brake the same as it approaches its stationary position, and said brake means being also operative for freeing the gear of braking forces as it approaches its rotating position.

2. The combination in a planetary transmission device including a ring gear and means for operatively shifting said gear to and from a stationary position and a position in which it rotates with a part of the transmission, of brake means mounted on and movable with said ring gear and operatively arranged to apply braking forces thereto as the gear approaches its stationary position, said brake means being automatically operative in response to the shifting movements of the ring gear.

3. In a planetary transmission of the character described, a ring gear operatively arranged for shifting movements between two adjusted positions in one of which it is mechanically locked against rotation and in the other of which it is mechanically locked to a rotating part of the transmission to rotate therewith, a carrier frame rotatably engaging the ring gear, means movably supporting the frame for adjusting the ring gear selectively to said adjusted positions, and brake shoes supported on and movable with said frame and operative to apply braking forces to the ring gear as it approaches its stationary position and for relieving said ring gear of braking forces as it approaches its rotating position.

4. In a planetary transmission of the character described, a ring gear operatively arranged for shifting movements between two adjusted positions in one of which it is mechanically locked against rotation and in the other of which it is mechanically locked to a rotating part of the transmission to rotate therewith, a carrier frame rotatably engaging the ring gear, means slidably supporting the frame for back and forth movements to carry the ring gear between its adjusted positions, brake shoes in the frame engaging the ring gear, and cam operating means coacting with said brake shoes and responsive to movement of the frame in one direction for urging said shoes into braking engagement with the ring gear.

5. In a planetary transmission of the character described, a ring gear operatively arranged for shifting movements parallel with the axis of the transmission to either of two adjusted positions, a carrier member rotatably engaging and supporting the ring gear, support pins arranged alongside the carrier member and slidably engaging and supporting the same for back and forth movements to carry the ring gear to said adjusted positions, brake shoes movably mounted in said carrier member, operating means arranged in engagement with said brake shoes to urge them inwardly into braking engagement with the ring gear, and said pins having irregular surfaces adapted to engage said operating means and urge the same against the brake shoes to apply said braking forces to the ring gear as the carrier member moves in one direction and to relieve said brake shoes of such engagement as the carrier member moves in the opposite direction.

6. In a planetary transmission of the character described, a ring gear operatively arranged for shifting movements parallel with the axis of the transmission to either of two adjusted positions, a carrier member rotatably engaging and supporting the ring gear, support pins arranged alongside the carrier member and slidably engaging and supporting the same for back and forth movements to carry the ring gear to said adjusted positions, brake shoes movably mounted in said carrier member, balls arranged against said brake shoes and adapted to roll against adjacent surfaces of the support pins, said surfaces being irregularly shaped to urge said balls into pressure engagement with the shoes and apply braking forces to the ring gear as the carrier member moves along the pins in one direction and to relieve the pressure against the shoes as the carrier member moves in the opposite direction.

7. In a planetary transmission of the character described, a ring gear operatively arranged for shifting movements to adjusted positions, a carrier member on which the ring gear is rotatably supported, means supporting the carrier member for shifting movements to carry the ring gear to said adjusted positions, at least one brake shoe supported on the carrier member for movement toward and away from a surface of the ring gear and adapted to normally clear that surface, and means operative to move said shoe toward the ring gear into frictional engagement with the surface thereof as the gear approaches one of its adjusted positions.

8. In a planetary transmission of the character described, a ring gear operatively arranged for shifting movements to adjusted positions, a carrier member on which the ring gear is rotatably supported, means supporting the carrier member for shifting movements to carry the ring gear to said adjusted positions, at least one brake shoe supported on the carrier member for movement toward and away from a surface of the ring gear and adapted to normally clear that surface, and means rigidly supported with respect to the carrier member and ring gear and adapted to engage said brake shoe to urge the same toward the gear into braking engagement with the surface thereof as the gear approaches one of said adjusted positions.

9. In a planetary transmission of the character described, a ring gear operatively arranged for shifting movements to adjusted positions, a carrier member on which the ring gear is rotatably supported, means supporting the carrier member for shifting movements to carry the ring gear to said adjusted positions, the said ring gear having a tongue on one surface and said tongue having sloping sides, at least one brake shoe supported on the carrier member for movement toward and away from said tongue, said shoe having a recess of a shape complementary to that of the tongue and adapted thereby to frictionally engage the sides thereof as the shoe moves toward the tongue, and means for urging the shoe toward the tongue as the gear approaches one of its adjusted positions.

10. In a planetary transmission of the character described, a ring gear operatively arranged for shifting movements parallel with the axis of the transmission to either of two adjusted positions, a carrier member rotatably engaging and supporting the ring gear, support members arranged adjacent the carrier member and slidably engaging and supporting the same for back and forth movements to carry the ring gear to said adjusted positions, brake shoes mounted on said carrier member for movement from normal positions clearing the gear toward the gear into braking engagement therewith, and said support members having cam surfaces operatively arranged to urge said brake shoes toward the gear as the gear approaches one of its adjusted positions.

JOHN E. HENNINGSEN.